July 9, 1957  E. G. SMITH ET AL  2,798,609
METHOD OF CONCENTRATING SLUDGE
Filed March 31, 1955  2 Sheets-Sheet 1

INVENTORS
EDMUND G. SMITH
OTELL M. COCCHIARELLA
BY
ATTORNEY

July 9, 1957
E. G. SMITH ET AL
2,798,609
METHOD OF CONCENTRATING SLUDGE
Filed March 31, 1955
2 Sheets-Sheet 2
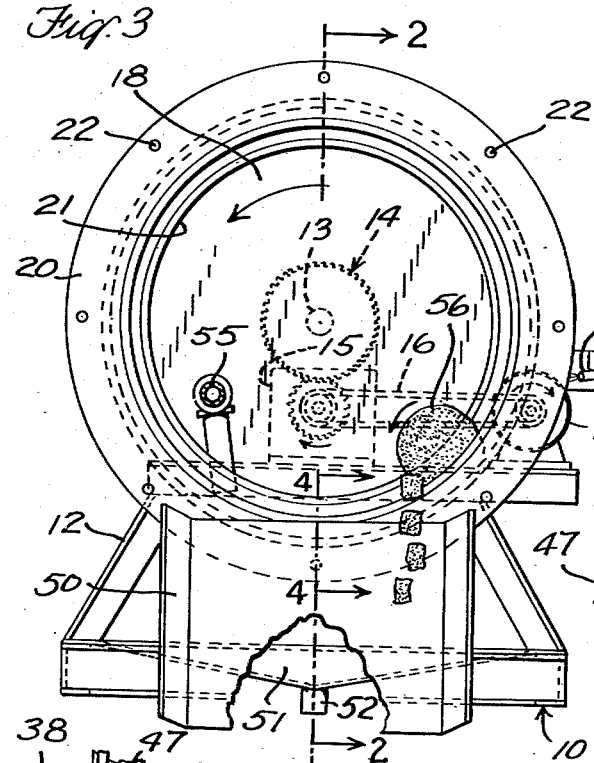
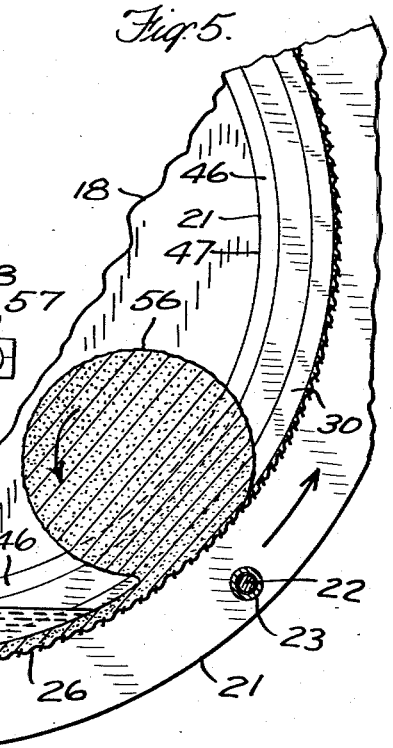
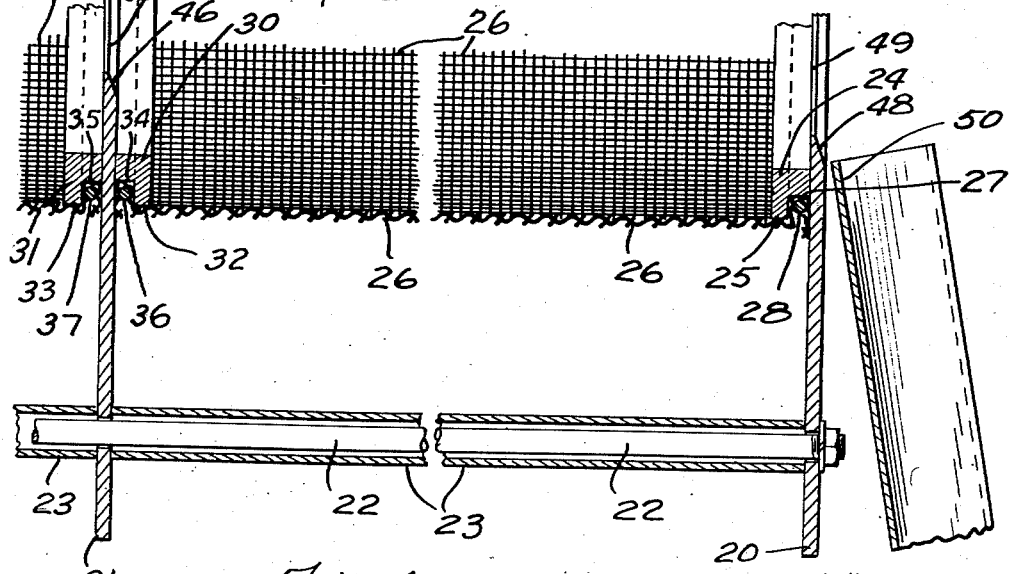
INVENTORS
EDMUND G. SMITH
OTELL M. COCCHIARELLA
BY
ATTORNEY

United States Patent Office 2,798,609
Patented July 9, 1957

2,798,609
METHOD OF CONCENTRATING SLUDGE

Edmund G. Smith, Cedar Grove, and Otell M. Cocchiarella, Verona, N. J., assignors to Equipment Development Co., Inc., Montclair, N. J., a corporation of New Jersey Application March 31, 1955, Serial No. 498,330

2 Claims. (Cl. 210—66)

This invention relates to method of concentrating sludge and has for an object to provide a novel and improved method for concentrating primary raw settled sludge as derived from sewage settling tanks, and other materials having similar characteristics.

Another object is to provide a simple and efficient method for dewatering sludge of the above type to the extent heretofore accomplished by digestion, sand beds, or chemical treatment and vacuum filters.

Various other objects and advantages will be apparent as the nature of the invention is more fully disclosed.

In accordance with one embodiment of the present invention the filter consists basically of a hollow cylindrical unit having a peripheral filter screen, which is rotated at a comparatively slow speed and into which is fed the sludge to be thickened. The rate of feed of the sludge and the speed of rotation of the cylindrical unit is so selected that a substantial portion of the liquid drains through the filter screen, leaving a thin layer of dewatered solids on the inner surface of the screen.

As the unit continues to rotate portions of this layer of solids agglomerate into a mass which eventually forms a cylindrically shaped plug which rolls within the rotating screen and builds up to a maximum size by picking up the sludge particles from the layer on which it rolls. When the plug reaches a maximum size it discharges over the open end of the cylinder either into a second unit for further dewatering, or to a discharge chute from which it may be taken to other treating stations.

The operation of the above embodiment is based upon the discovery that sludge and other similar materials must be filtered within a critical pressure range. The pressure must be sufficient to cause the liquid to be separated and to be discharged at a reasonable rate and at the same time must be below that which would cause the solids to break down or to become embedded in the mesh of the screen. If the solids should become embedded in the screen, other solids would adhere thereto and cover an increasing area until the entire screen is covered with a layer of solids which would interrupt the filtering action. The present invention accordingly provides for filtering at a controllable low pressure and under conditions to maintain the filter screen clean for continuous use.

The nature of the invention will be better understood by referring to the following description, taken in connection with the accompanying drawings in which a specific embodiment thereof has been set forth for purposes of illustration.

In the drawing:

Fig. 3 is an end elevation of the filter unit shown in Fig. 1;

Fig. 4 is a partial section taken on the line 4—4 of Fig. 3 but on a larger scale; and Fig. 5 is a partial section taken on the line 5—5 of Fig. 2, but on a larger scale.

Figure 1:
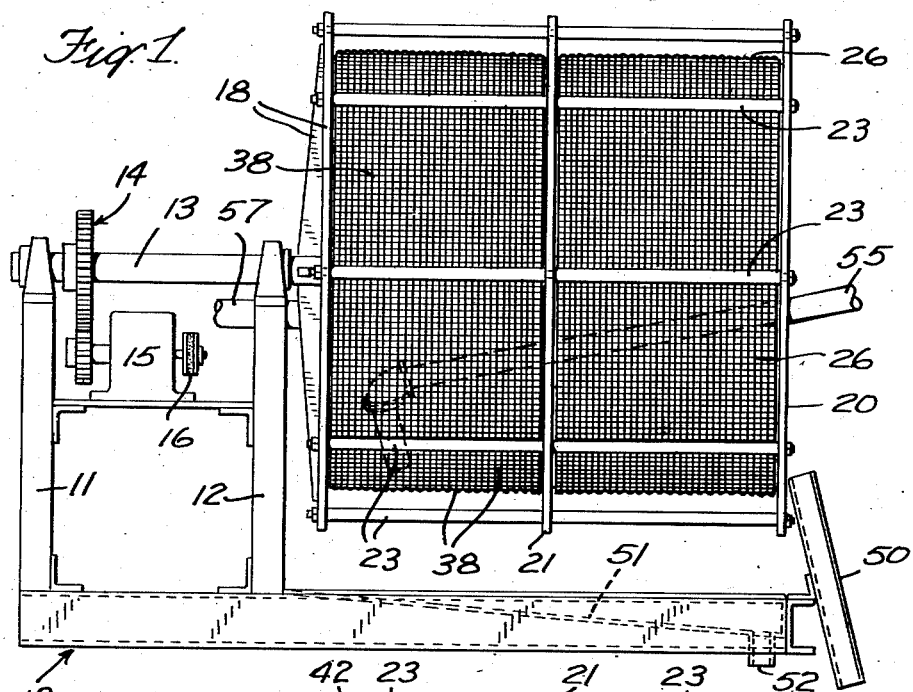
Fig. 1 is a side elevation of a filter unit embodying the present invention.
Figure 2:
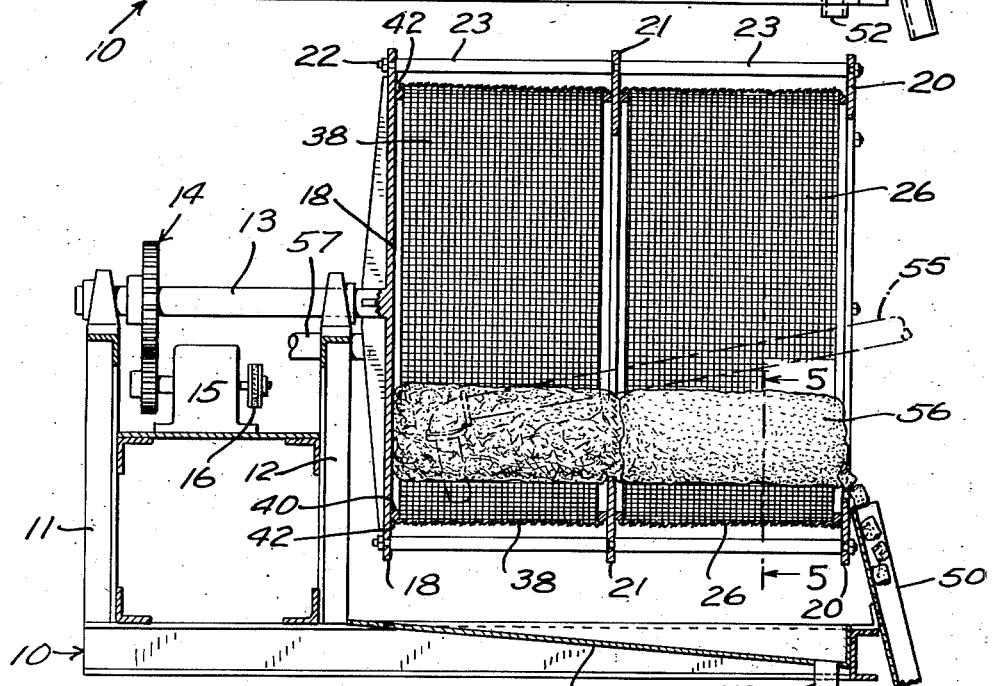
Fig. 2 is a vertical axial section taken on the line 2—2 of Fig. 3.

Referring to the drawings more in detail, the invention is shown as comprising a base 10 carrying a pair of pedestals 11 and 12. A shaft 13 carrying the filter unit is mounted in suitable bearings in the pedestals 11 and 12. The shaft 13 is driven through a gear train 14 from a reducing gear box 15 which is driven by a belt 16 from a suitable source of power shown as a motor 17.

The shaft 13 is attached at one end to a reinforced disk 18 which constitutes a supporting head for the filter unit. An end ring 20 and an intermediate ring 21 are rigidly mounted on the head 18 by tie rods 22 extending through spacing tubes 23. Such tie rods and spacing tubes are spaced around the periphery of the head 18 and support the assembly as a rigid unit. The rings 20 and 21 carry annular channel members 24 and 30, having peripheral surfaces 25 and 32 which are adapted to support the opposite ends of a cylindrical filter screen 26 such as a filter cloth of the high twist synthetic monofilament type as shown in U. S. Patent No. 2,551,175. The channel members 24 and 30 are provided with peripheral grooves 27 and 34 in which the respective ends of the filter cloth extend and are secured by packing such as ropes or cords 28 and 36.

The center ring 21 is also provided with a second annular channel member 31 having a peripheral surface 33 over which a filter cloth 38 is positioned and having an annular groove 35 in which one end of the filter cloth 38 is secured by packing 37. The head 18 is provided with a similar annular channel member 40 carrying and positioning the other end of the filter cloth 38 and having an annular groove 42 in which the cloth is secured by packing as above described.

In the embodiment shown the filter cloths 26 and 38 are in the form of comparatively rigid cylindrical screens which are unsupported except at their ends. There are no external wires or the like on which solid particles can become lodged or wedged and interfere with the cleaning of the screens.

The ring 21 extends inwardly to form a confining and division wall separating the filter chambers formed by the screens 26 and 38 respectively. The inward edge of the ring 21 is formed with an inclined surface 46 terminating in a sharp edge 47 for cutting off the end of the plug of solids as it feeds from the first to the second chamber in the manner to be described.

The ring 20 also extends inwardly from the periphery of the cylindrical screen 26 to form an end wall and is formed on its inner edge with an inclined surface 48 terminating in a sharp edge 49 over which the end of the plug passes and is continuously cut away into a discharge chute 50. A collecting basin 51 for expressed liquids is disposed beneath the screens 26 and 38 and drains through a discharge spout 52.

The sludge liquid is fed into the first unit by an inlet pipe 55 which is suitably supported and extends into the unit from the open end and is provided with discharge openings in the portion above the cylindrical screen 38. The inlet pipe is preferably located about 50° above the vertical center line contra to the direction of rotation of the unit.

Wash water may be applied to the outside of the filter cloth from a pipe 57 having a spray head 58 in a position to assist in removing the sludge particles from the screen. Alternatively an air blast may be directed through the filter screen from the nozzles 58 to assist in keeping it clean and to insure that the plug rolls properly on the advancing layer of solids. In any event sprays may be used to wash the filter screen at the shutdown of operations so as to clean the screen of material which would decompose due to algae or bacterial growth.

The sludge liquid drains through the filter screen under low liquid pressure, leaving a layer of solids on the screen. With continued slow application of the sludge and rotation of the filter unit, the sludge solids build up and start a small collection or mass in the form of a cylindrical plug 56 which rolls on the layer of solids on the advancing screen. As this cylindrical plug rolls it picks up additional solids from the filter screen by particle adhesion, leaving the filter screen substantially clean. It also serves to squeeze more liquid out of the layer on which it rolls thereby further dewatering the sludge.

After a short period of operation the rolling plug 56 reaches a maximum size which depends upon the height of the ring 21. The end of the plug then passes over the ring and is cut off thereby to fall onto the filter medium 26 of the second stage where the same operation is repeated with further dewatering and the formation of a second rolling plug.

The apparatus must be so operated that the weight of the plug is limited to that which is adapted to dewater the sludge layer without breaking down the solid particles or forcing them into the mesh of the screen. In a specific example, utilizing a cylindrical filter screen about 14 inches in length, the plug may reach a diameter of six to nine inches and a weight of some 35 pounds. The length of the cylinder must be such that the weight of the plug does not unduly deform the cylindrical screen as it rolls thereover. Such deformation would tend to break up the plug and interfere with its proper operation.

It is to be understood of course that the operation of this device requires a sludge of the type which will adhere to itself rather than to the filter screen, such for example as sewage sludge above referred to.

The rate of feed of the liquid is controlled so that flooding of the compartment cannot occur. Otherwise the rolling plug would break down and become liquid again, thereby reducing its ability to clean the cloth.

The final plug formed in the second unit passes over the end ring 20 and continuously breaks off and is discharged into the discharge chute 50. It may be desirable to use a more coarse filter screen for the second stage than for the first inasmuch as the sludge is more highly dewatered as it enters the second stage. A cloth, as above described, is usually preferred to a wire screen as the constant flexing due to the weight of the rolling plug tends to break the wires.

It is obvious that the device may be made in any desired number of stages or may be made in a single stage. The speed of rotation of the filter is an important consideration. For the first stage wherein the largest percentage of liquid is removed, the maximum linear speed for the filtering of sewage sludge should not exceed about 15 feet per minute. On successive stages lower speeds may be used to remove the balance of the liquid. An excessive speed will cause the water passing through the screen to carry over with the sludge.

While two stages have been shown as connected together in the present case and are necessarily driven at the same speed it is obvious that a pair of single units may be employed which may be driven at different speeds if desired for maximum efficiency. In that case the second stage could be driven at a speed of 3 feet per minute.

It has been found that any solid particles which enter the rolling plug eventually work through into the center of the plug. The center portion of the somewhat plastic plug protrudes over the discharge ring at the end of the unit and breaks off into the second chamber or into the discharge chute.

The action of the above described filter is faster on materials which tend to compress readily and allow free escape of liquid. The filtering rate can be increased by adding coarse material such as wood pulp, paper pulp, or other fibrous matter to sludges that are not sufficiently free draining. Increasing the temperature of the sludge or adding chemicals to flocculate the solids also increases the filtering rate.

A filter of the above type is also useful to elutriate sludges where separation of the colloidal or fine particles from the rest of the particles is desirable. For example separation of dye and ink from pulp in a preparation of magazine stock for reuse can be accomplished readily. In addition various types of paper pulp can be concentrated on this device. Coarse materials such as crystalline solids can also be readily handled.

Although a specific embodiment of the invention has been set forth for purposes of illustration it will be understood that the invention is capable of various uses and that changes and adaptations may be made therein as will be apparent to a person skilled in the art.

What is claimed is:

1. The method of concentrating primary raw settled sewage sludge or the like composed of solids suspended in a liquid by the use of a rotary cylindrical screen rotating about a horizontal axis and having an annular ring shaped end wall forming with said cylindrical screen an annular channel within said screen, which method comprises continuously feeding said sludge into said channel on the descending side of said rotating filter screen, said feeding being at a rate to allow the liquid to drain through said screen and leave a layer of wet concentrated sludge solids on said screen, while rotating said cylindrical screen at a rate to cause the sludge solids on the ascending side of the cylindrical screen to form into a cylindrical plug which rolls downwardly over said sludge layer squeezing more liquid therefrom due to its weight and picking up and stripping the solids from said ascending screen as it rolls, and discharging end portions of said plug over said end wall as the plug attains a diameter sufficient to break over said end wall, whereby the mass of the plug remains substantially constant during the operation.

2. In the method set forth in claim 1 the additional step of incorporating a fibrous material with the sludge to prevent the layer of sludge from compacting and entrapping the water.

References Cited in the file of this patent

UNITED STATES PATENTS

| | | |
|---|---|---|
| 869,720 | Mathias | Oct. 29, 1907 |
| 2,257,686 | Hock | Sept. 30, 1941 |
| 2,342,321 | Adams | Feb. 22, 1944 |